Feb. 20, 1934.  B. LOEFFLER  1,947,996
ENGINE BRAKE
Filed Oct. 23, 1931  3 Sheets-Sheet 2

INVENTOR
Bruno Loeffler,
BY Redding, Greeley, O'Shea & Campbell
HIS ATTORNEYS

Feb. 20, 1934.  B. LOEFFLER  1,947,996
ENGINE BRAKE
Filed Oct. 23, 1931  3 Sheets-Sheet 3
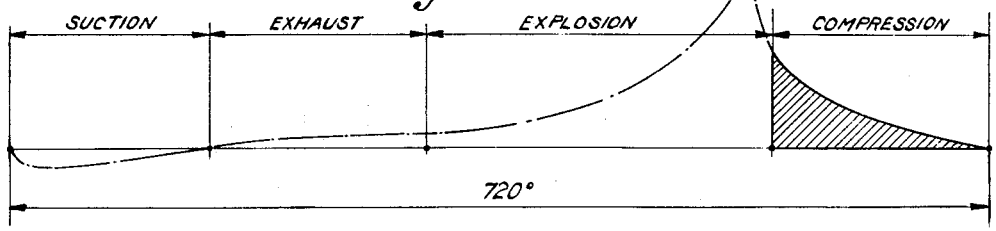
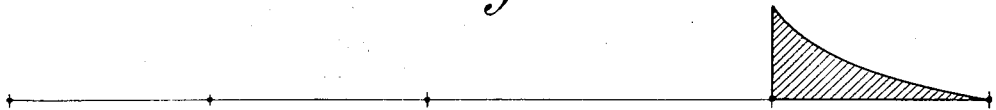
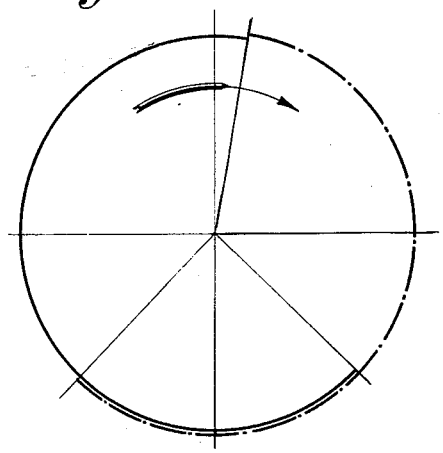
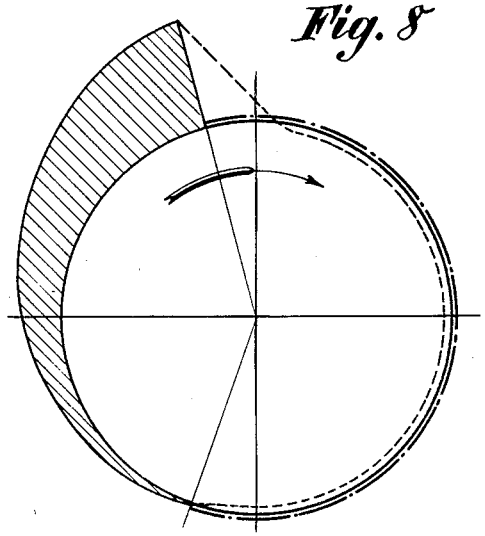
INVENTOR
Bruno Loeffler,
BY Redding, Greeley, O'Shea & Campbell
HIS ATTORNEYS Patented Feb. 20, 1934

1,947,996

UNITED STATES PATENT OFFICE 1,947,996

ENGINE BRAKE

Bruno Loeffler, Plainfield, N. J., assignor to International Motor Company, New York, N. Y., a corporation of Delaware Application October 23, 1931. Serial No. 570,649

3 Claims. (Cl. 123—197)

The present invention relates to engine brakes and embodies, more specifically, an improved form of engine brake by means of which an internal combustion engine adapted to drive a motor vehicle may be conveniently and effectively converted into an air compressor to exert a braking effect upon the transmission shaft and thus effect the retardation of the motion of the vehicle under such conditions. Various forms of engine brakes have been designed and used with different degrees of success, considerable difficulty being experienced in providing an effective and simple means of converting the engine into a compressor and the present invention has for an object the provision of a mechanism which is not only simple in construction and operation but functions effectively to transform the engine into a compressor without endangering the operation thereof.

A further object of the invention is to provide a mechanism of the above character wherein the engine inlet valves are maintained closed during operation of the engine as a compressor, the construction being such that the inlet valves cannot open under any conditions.

A further object of the invention is to convert a four cycle engine into a two cycle compressor to serve as a braking means for a vehicle.

A further object of the invention is to provide a cam shaft operated mechanism for controlling the engine valves to convert a four cycle engine into a two cycle compressor.

A further object of the invention is to provide a cam shaft operating mechanism for controlling the inlet and exhaust valves of an engine, the cam shaft being mounted for axial movement to effect such operation.

A further object of the invention is to provide, in a cam shaft controlling mechanism, means for mounting the shaft effectively to preserve a desired driving connection between the same and the driving gears.

Further objects, not specifically enumerated above, will be apparent as the invention is described in greater detail in connection with the accompanying drawings, wherein:

Figure 4 is a diagrammatic representation of the work curve of a four cycle engine.

Figure 5 is a view similar to Figure 4, showing the available pressure of the same engine operating as a four cycle compressor.

Figure 6 is a diagram similar to Figure 4 showing the engine operating as a two cycle compressor.

Figure 7 is a valve timing diagram on a crank shaft when the same is not operating as an engine brake.

Figure 8 is a view similar to Figure 7, showing the diagram of the engine operating as a brake.

The operation of a four cycle engine as will be readily understood, includes a compression stroke, an explosion stroke, an exhaust stroke, and a suction stroke, these cycles taking place in two revolutions of the engine crank shaft. With reference to Figure 4, these cycles are represented in a curve, suitable legends being utilized to define each cycle. The work available in the compression cycle is represented by the shaded area and in a four cycle compressor, this would represent the amount of braking action available from each cylinder. Figure 5 represents this condition diagrammatically. By converting the four cycle engine into a two cycle compressor, the available braking action is substantially doubled since the exhaust stage of the four cycle engine is utilized as one of the compression stages of the two cycle compressor. It will thus be seen that the braking action afforded by the present invention is much greater than that heretofore provided in existing engine brake constructions.

The valve timing to accomplish the foregoing is indicated diagrammatically in Figures 7 and 8, wherein Figure 7 represents the timing diagram for the engine when operating as a four cycle engine. The dot and dash arc represents the portion of the revolution of the crank shaft during which the inlet valves are opened while the solid arc represents the period during which the exhaust valves open. This is in accordance with the usual practice in four cycle engine operation.

Comparing the diagram of Figure 7 to that of Figure 8, it will be seen that the valve operation, when the engine is operating as a two cycle compressor, is moved by shifting of the exhaust valve timing to afford a compression cycle represented by the shaded part above the aforementioned arc.

Figure 1:
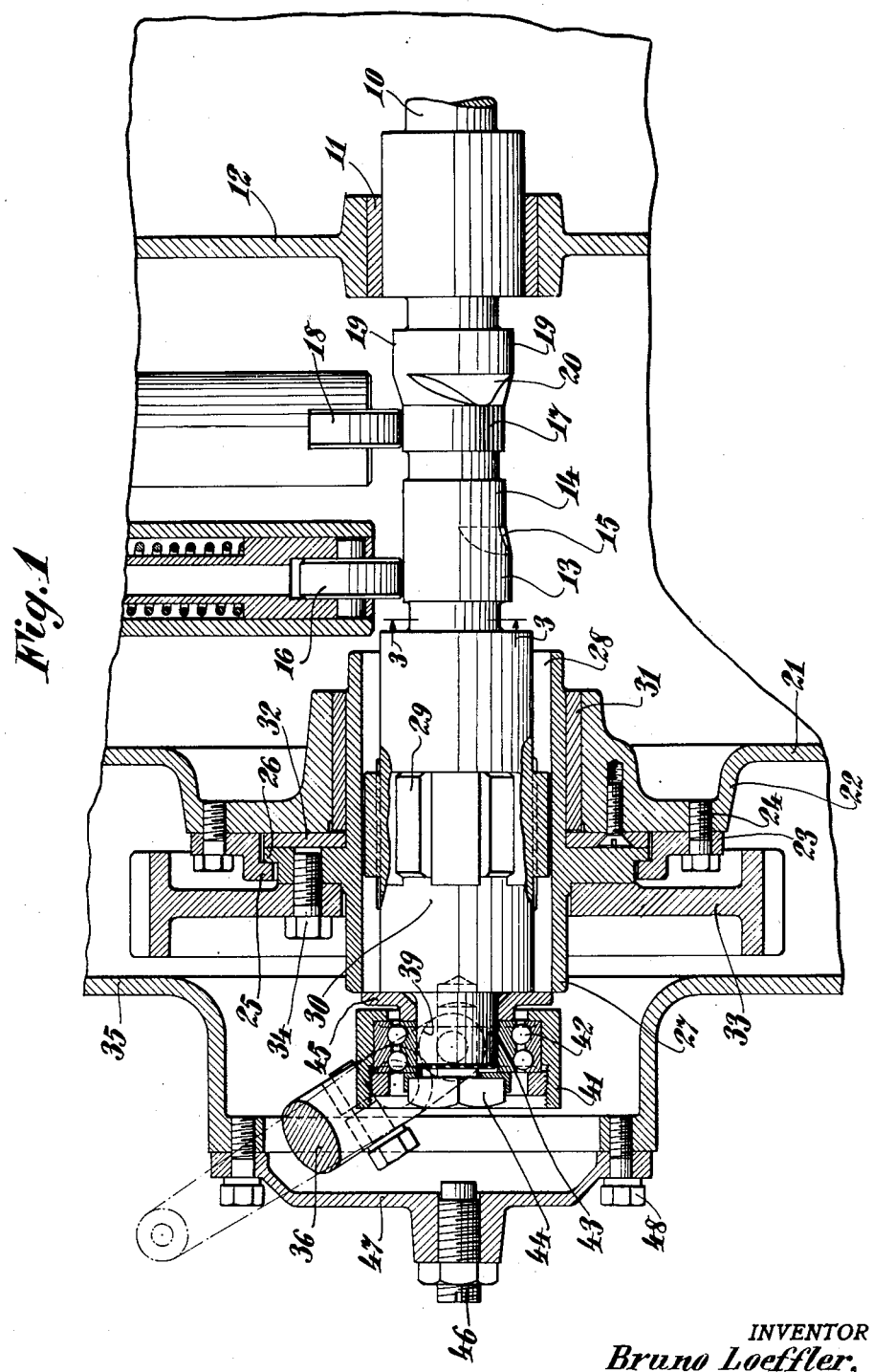
Figure 1 is a view in elevation, partly broken away and in section, showing one end of a cam shaft of an engine provided with controlling means to effect the engine valve actuation in a predetermined fashion.
Figure 2:
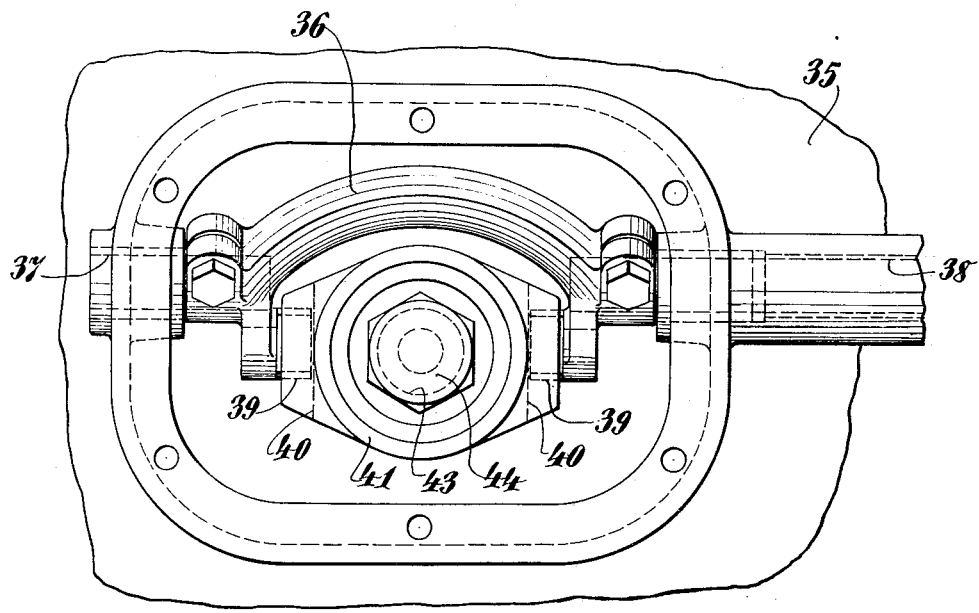
Figure 2 is a view in end elevation showing the cam shaft controlling mechanism of Figure 1.
Figure 3:
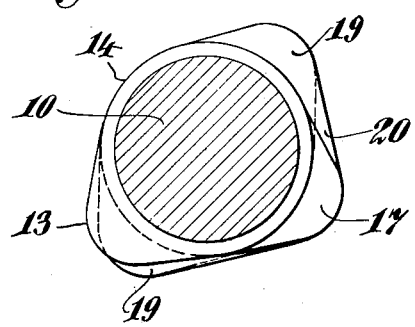
Figure 3 is a view in section, taken on line 3—3 of Figure 1, and looking in the direction of the arrows.

The accomplishment of the foregoing engine operation is effected by means of the construction shown in Figures 1, 2, and 3, wherein the engine cam shaft is shown at 10 as suitably journaled at 11 in an engine crank case 12, the crank shaft being provided with a series of cams 13 for actuating the inlet valves. The number of inlet cams equals the number of cylinders or inlet valve lifters for the cylinders. Adjacent each inlet cam 13 is a cylindrical concentric surface 14 on the shaft 10 connected to the cam 13 by a sloping surface 15. Upon axial movement of the cam shaft 10 to the left, as viewed in Figure 1, the inlet cam 13 will move from under the inlet valve lifter roller 16 and the roller will move down the incline 15 to engage the cylindrical surface 14. Inasmuch as this surface is concentric with the shaft 10 a dwell in the inlet valve actuation results.

Suitably formed exhaust cams 17 are formed upon the cam shaft 10 and actuate exhaust valve lifter rollers 18 in a well known fashion. As indicated in the foregoing portion of the description, the exhaust valves are to be actuated to convert the engine into a two cycle compressor and therefore the lifter rollers 18 must engage suitable cams upon the shaft 10 when the latter is shifted axially. Since the compressor is to actuate upon the two cycle principle and the exhaust valves closed during each revolution of the crank shaft, diametrically opposed brake cams 19 are formed on the shaft 10 to cause the exhaust valve lifter rollers to be actuated twice for each revolution of the cam shaft. To facilitate the movement of the roller 18 from the cam track 17 to the cam track 19, sloping surfaces 20 are formed, axial movement of the cam shaft being thus facilitated. When the cam shaft is shifted to its extreme left hand position, as viewed in Figure 1, the inlet lifter roller 16 engages the inlet dwell track 14 to prevent operation of the inlet valves while the exhaust lifter roller 18 engages the brake cam track 19 and the engine operates as a two cycle compressor. Upon movement of the cam shaft 10 to its right hand position, as shown in Figure 1, the inlet lifter roller 16 rides upon the inlet cam track 13 and the exhaust lifter roller 18 rides upon the exhaust cam track 17. The engine then operates as a four cycle engine.

The forward wall 21 of the engine crank case is formed with a land 22 upon which a split annular ring 23 is secured by means of bolts 24. The ring 23 is formed with a flange 25 which engages a cooperating radial flange 26, formed upon a sleeve 27. The sleeve is grooved at 28 to engage splines 29, formed upon the cam shaft head 30, thus journaling the head 30 effectively in the crank case housing and permitting axial movement of the crank shaft. A cylindrical bushing 31 journals the sleeve in the land 22 while an annular bushing 32 takes the axial thrust of sleeve 27 in one direction. The timing gear 33 for driving the cam shaft is bolted directly to the flange 26 by means of bolts 34 and the resulting construction affords spaced bearings between the sleeve and shaft upon opposite sides of the splined connection which serves as the hub of timing gear 33 thus preventing cocking of the gear and faulty operation of the mechanism.

Within the outer casing wall 35, a yoke 36 is mounted by means of oppositely extending trunnions 37. This yoke is actuated by a shaft 38 which is suitably controlled by the engine operator and shifting fingers 39, carried by the yoke 36, engage cooperating grooves 40 in a collar 41. The collar 41 is journaled at 42 upon an extension 43 which is formed on the cam shaft 10. Bolt 44 secures the bearing 42 to the cam shaft together with a limit disc 45 which limits the movement of the cam shaft 10 toward the right. Such limitation of movement is effected by the engagement of the disc 45 with the adjacent end of the sleeve 27, as shown in Figure 1. Movement of the cam shaft in the opposite direction is limited by an adjustable set screw 46 which is mounted in a cover plate 47 and adapted to engage the head of bolt 44. The cover plate 47 is secured to the outer casing 35 by means of bolts 48.

It will thus be seen that axial movement of the cam shaft is readily effected without disturbing the drive between the timing gears and cam shaft, the resulting construction affording a mechanism for controlling the inlet and exhaust valves of a four cycle engine in such fashion that the engine may be operated as a two cycle compressor.

While the invention has been described with specific reference to the accompanying drawings, it is not to be limited, save as defined in the appended claims.

I claim as my invention:

1. In combination with an internal combustion engine having a crank shaft, and a cam shaft having inlet and exhaust cams, means to shift the cam shaft axially, a timing gear, a sleeve secured to the gear, a splined connection between the sleeve and shaft, and spaced bearings between the sleeve and shaft upon opposite sides of the splined connection.

2. In combination with an internal combustion engine having a crank shaft, and a cam shaft having inlet and exhaust cams, means to shift the cam shaft axially, a timing gear, a sleeve having a flange secured to the gear, means to journal the sleeve and flange upon the engine, a splined connection between the sleeve and shaft, and spaced bearings between the sleeve and shaft upon opposite sides of the splined connection.

3. In combination with an internal combustion engine having a crank shaft, and a cam shaft having inlet and exhaust cams, means to shift the cam shaft axially, a timing gear, a sleeve having a flange secured to the gear, means to journal the sleeve and flange upon the engine, spaced bearings between the sleeve and shaft upon opposite sides of the splined connection, an extension on the cam shaft, a shifting collar, a limiting plate on the extension adapted to engage the sleeve, a bearing on the extension, and an adjustable stop means engaging the extension to limit movement of the cam shaft.

BRUNO LOEFFLER.